Patented Feb. 12, 1952

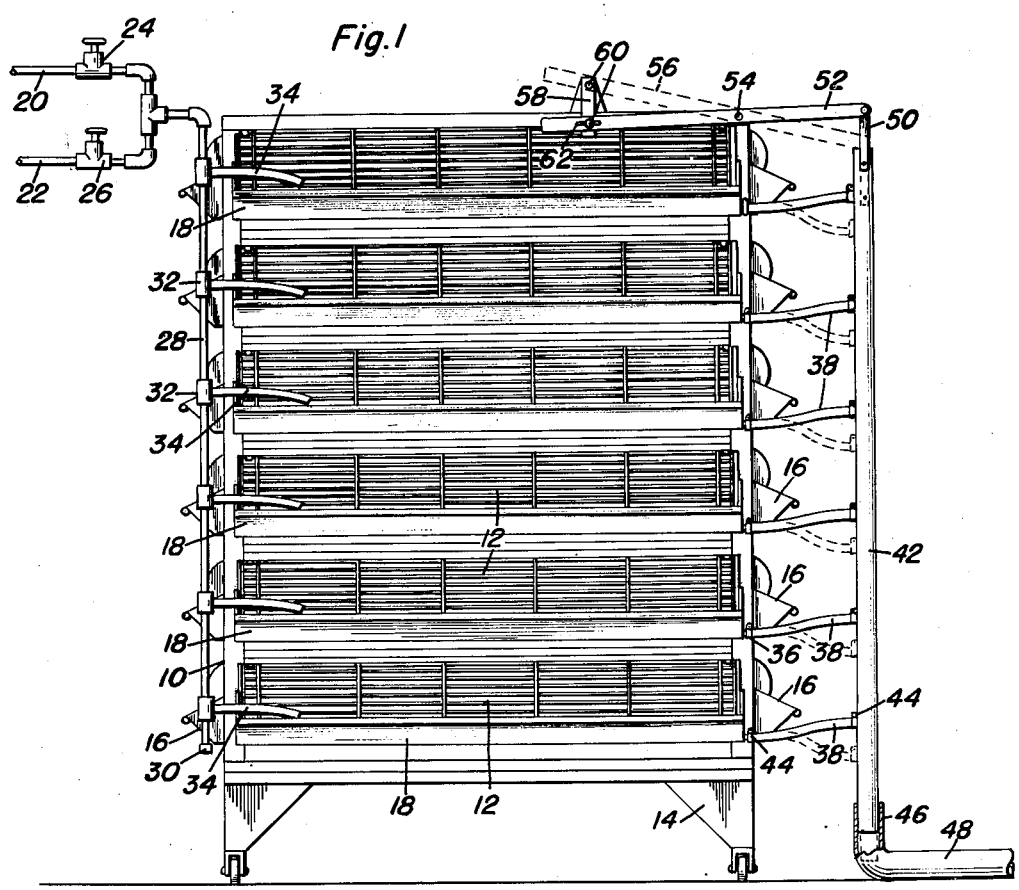
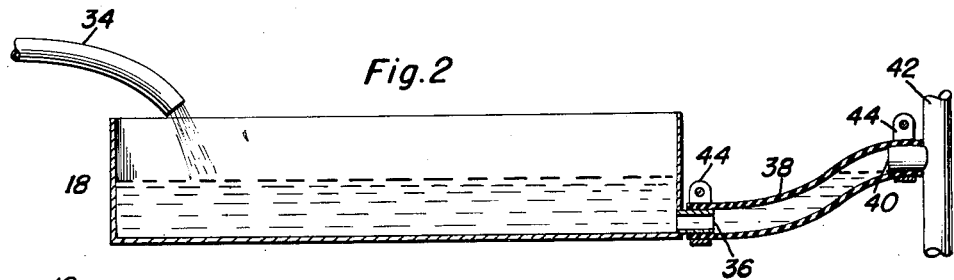
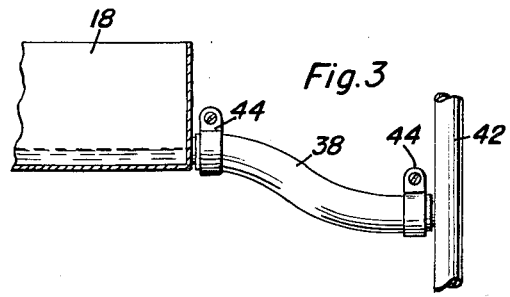

2,585,698

UNITED STATES PATENT OFFICE 2,585,698

AUTOMATIC SANITARY WATER SYSTEM FOR BATTERY BROODERS

Nello Verne Spring, Bogalusa, La.

Application November 24, 1950, Serial No. 197,366

5 Claims. (Cl. 119—22)

This invention relates generally to battery brooders and more particularly to means for providing for the filling, draining and sterilizing of water troughs used in connection with the brooders.

A primary object of this invention is to provide means whereby the water level in water troughs of battery brooders can easily be controlled, the same means permitting complete drainage of the troughs when desired.

Another object of this invention is to provide means whereby the draining of all the troughs in a particular battery brooder can be accomplished at one time, and whereby the filling of each of the troughs in a battery brooder can also be accomplished at one time.

Yet another object of this invention is to provide particularly suitable means for sterilizing the troughs with hot water, this sterilization being both facilitated and accelerated, it being noted that sterilization of the water troughs in installations of this character is of extreme importance in combatting losses from disease. In this connection, also, it is important that medicinal disinfection is probably made unnecessary.

Another object of this invention is to provide means of the character mentioned above which can be adapted to existing brooders, as well as provided as component parts of new brooders.

A last object to be mentioned specifically is to provide a device of this character which is relatively inexpensive and practicable to manufacture, which is simple, safe and convenient to use, which is adaptable for use under a great many different conditions and with a large variety of different types of brooders, and which will give generally efficient and durable service.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application, and in which:

Figure 1 is a side elevational view of the assembled invention;

Figure 2 is an enlarged vertical longitudinal sectional view showing one of the water troughs and adjacent and coacting structure fragmentarily; and Figure 3 is a similar view of the structure shown in the right-hand part of Figure 2, the trough being unmoved but the outlet pipe end of the tube being shown in a second or lowered position, as when the troughs are being drained.

Similar characters of reference designate similar or identical elements and portions throughout the specification and throughout the different views in the drawing.

Referring now to the drawing in detail, this invention includes a frame 10 which supports a plurality of coop sections 12, in vertically spaced relation, the frame being itself supported on legs 14 which may be provided with casters according to conventional practice. Each section 12 will be provided with feed troughs 16, or like structure, which feed troughs have no direct bearing upon this invention, these feed troughs being ordinarily placed upon sides of the sections other than the sides upon which the water troughs 18 are placed. The water troughs are, of course, important elements of this invention and are shown as extending horizontally across the front of each section 12. Obviously, the troughs might be supported either upon the sections or on the frame 10, according to the dictates of mechanical expediency and convenience of the operator.

A hot water inlet 20 and a cold water inlet 22 are each provided with valves 24 and 26, respectively, and these inlets 20 and 22 are connected to an inlet pipe 28 which is vertical and which extends downwardly beside the frame 10, to which it may be fixed if desired, although any suitable means for support thereof, not shown, may be used. The lower end of this inlet pipe 28 is closed, as indicated at 30. A plurality of T-connections will be incorporated in the inlet pipe 28 so that inlet tubes 34, preferably somewhat flexible, although not absolutely necessarily so, may be disposed as indicated best in Figure 1 to direct water into the several troughs 18. Ordinarily the inlet tubes 34 will be spaced vertically at intervals corresponding to the vertical spacing of the troughs 18.

Near the bottom of each trough 18 is an outlet nipple 36, illustrated as disposed at the end of each trough remote from the inlet tube 34, this disposition of the outlet nipple 36 being preferable in order that a flow along the complete length of each trough can be assured. A flexible tube 38 is connected to each one of the outlet nipples 36, the other end of each tube being connected to a similar plurality of nipples 40 provided on one side of a vertical outlet pipe 42, suitable clamps 44 being provided to secure the flexible outlet tubes to said nipples 36 and 40. The lower end of the outlet pipe 42 is telescopically mounted in an upwardly extending portion 46 of a sewer pipe connection 48. The upper end of the outlet pipe 42 is provided with a strap 50 which is pivoted to one end of a lever 52, this lever being pivoted on the frame 10. It will be evident that operation of the lever 52 will raise and lower the outlet pipe 42 with reference to the troughs 18, so that the nipples 40 may be raised above or depressed slightly below the levels of the nipples 36, thus allowing the troughs to be either filled or drained at the pleasure of the operator. Figure 1 shows the depressed position of the outlet pipe 42 in dash lines, and the lever 52 is shown in corresponding position, as indicated at 56. A bracket 58 is secured to the top of the frame 10 and this bracket has a pair of vertically spaced pins 60 which engage in a slot 62 in the lever 52, to hold the lever in either raised or lowered position.

The operation of this invention will be clearly understood from a consideration of the foregoing description of the mechanical details thereof, taken in connection with the drawing and with the above recitation of the objects sought to be achieved by this invention. In recapitulation, it need only be added that hot water or cold water may be admitted to the troughs 18 by the selective operation of the valves 24 and 26. When it is desired to fill the troughs 18, the outlet tube 42 is raised into that position assumed by the tube as represented in the full line position of Figure 1. When it is desired to drain the troughs, the lever is moved into the position as indicated at 56. It should be noted that the upright portion 46 of the sewer connection 48 comprises a guide for the lower end of the outlet pipe 42. When it is desired to sterilize the troughs 18, the hot water is flowed through the troughs, preferably rather swiftly, the outlet pipe 42 being, of course, in depressed position during only a portion of such sterilizing operation so that all portions normally filled by the cold water will be sterilized by the hot water.

It is believed that the above represents a complete disclosure of this invention and further description would appear unnecessary.

Having described the invention, what is claimed as new is:

1. In a battery brooder, a plurality of vertically spaced coop sections, a trough adjacent each section, a vertical inlet pipe, means connecting the inlet pipe to a source of water, water inlet tubes leading from said inlet pipe to said troughs, a vertical outlet pipe, outlet tubes leading from bottom portions of said troughs to said outlet pipe and means operatively connected to said outlet pipe to raise and lower said outlet pipe so that the troughs may be filled when the outlet pipe is raised and drained when the outlet pipe is lowered.

2. In a battery brooder, a plurality of vertically spaced coop sections, a trough adjacent each section, a vertical inlet pipe, means connecting the inlet pipe to a source of water, water inlet tubes leading from said inlet pipe to said troughs, a vertical outlet pipe, outlet tubes leading from bottom portions of said troughs to said outlet pipe and means operatively connected to said outlet pipe to raise and lower said outlet pipe so that the troughs may be filled when the outlet pipe is raised and drained when the outlet pipe is lowered, said outlet tubes having their connections with said outlet pipe spaced vertically to conform with the vertical spacing of the troughs.

3. In a battery brooder, a plurality of vertically spaced coop sections, a trough adjacent each section, a vertical inlet pipe, means connecting the inlet pipe to a source of water, water inlet tubes leading from said inlet pipe to said troughs, a vertical outlet pipe, outlet tubes leading from bottom portions of said troughs to said outlet pipe and means operatively connected to said outlet pipe to raise and lower said outlet pipe so that the troughs may be filled when the outlet pipe is raised and drained when the outlet pipe is lowered, said outlet tubes having their connections with said outlet pipe spaced vertically to conform with the vertical spacing of the troughs, said sections having a supporting frame, and said means to raise and lower the outlet pipe comprising a lever pivoted on said frame and connected to said outlet pipe.

4. A brooder according to claim 3 and including a vertical sewer pipe connection, said outlet pipe being telescopically mounted in said sewer pipe connection at the bottom and supported at the top by said lever.

5. A brooder according to claim 1 and including sources of hot and cold water, said connecting means allowing selective connection of the inlet pipe to said sources of hot and cold water.

NELLO VERNE SPRING.

REFERENCES CITED

The following references are of record in the file of this patent:

UNITED STATES PATENTS

| Number | Name | Date |
| --- | --- | --- |
| 479,197 | Rockfellow | July 19, 1892 |
| 492,568 | Allis | Feb. 28, 1893 |
| 526,911 | Sanford | Oct. 2, 1894 |
| 2,006,191 | Anderson | June 25, 1935 |
| 2,212,549 | Olson et al. | Aug. 27, 1940 |
| 2,264,959 | Sperry et al. | Dec. 2, 1941 |